Jan. 30, 1951   E. A. CREIGHTON   2,539,508
TRUSS
Filed May 8, 1947
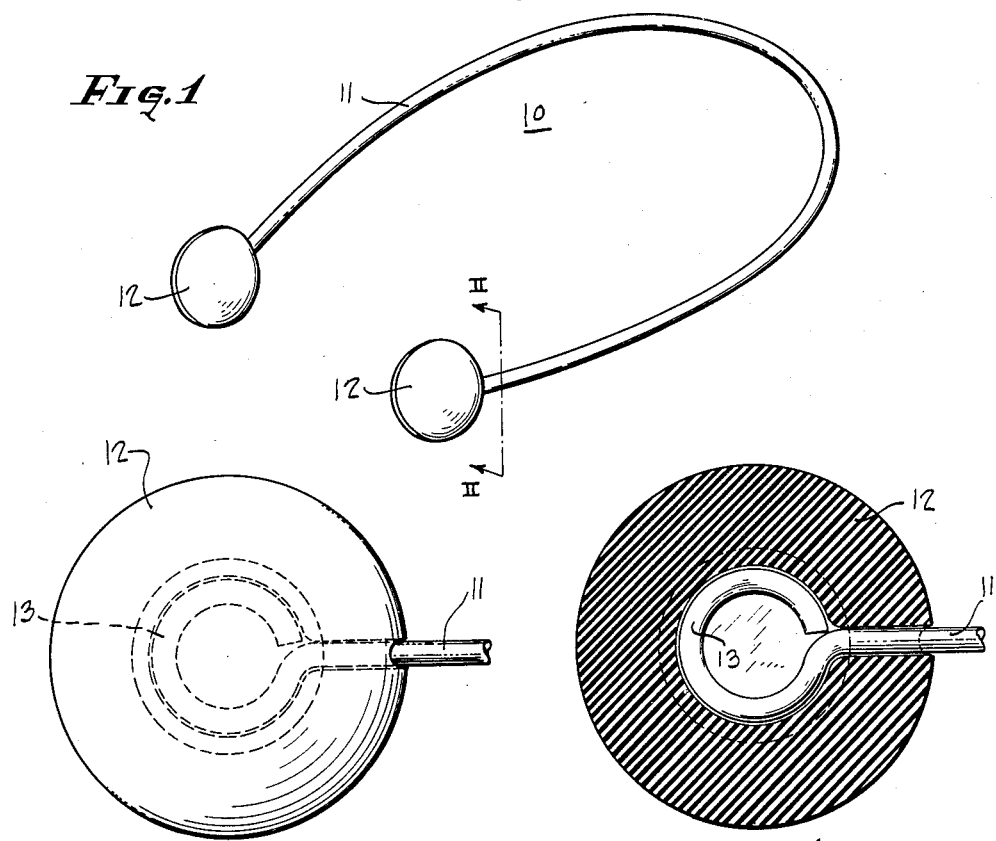
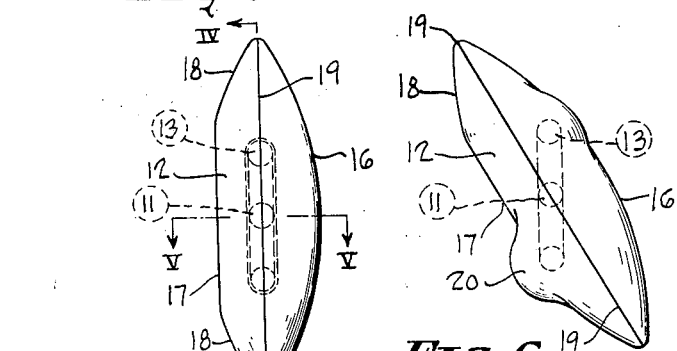
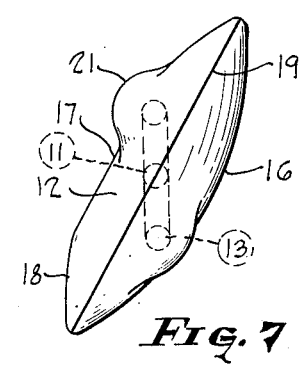
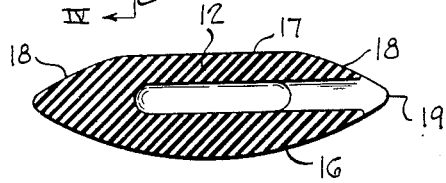
INVENTOR.
EDGAR A. CREIGHTON
BY
Ralph T. Brunch
ATTORNEY.

Patented Jan. 30, 1951

2,539,508

UNITED STATES PATENT OFFICE 2,539,508

TRUSS

Edgar A. Creighton, Bridgeboro, N. J.

Application May 8, 1947, Serial No. 746,641

1 Claim. (Cl. 128—117)

This invention relates to trusses, more particularly to trusses for supporting and retaining hernias, and has for an object to provide improved devices of this character.

Another object of the invention is to provide a novel support for a hernia pad, which permits easy and quick replacement or removal of the pad with respect to its support.

A further object of the invention is to provide a connection between a hernia pad and its support, which connection permits the pad to swivel relative to its support while maintaining its hernia-supporting action.

Yet another object of the invention is to provide a deformable hernia pad, together with a non-deformable support therefor, whereby movement of the pad relative to the support causes the latter to deform the pad to maintain the hernia-supporting action.

A further object of the invention is to provide a pad-type hernia support whose pad is movable relative to its support to conform to movement of the wearer's body, and which support exerts pressure at a constant angle regardless of movements of the pad.

Another object of the invention is to provide a swivel connection between a hernia pad and its support such that the angle of support applied to the hernia is substantially constant, regardless of swiveling of the pad relative to its support.

Yet another object of the invention is to provide, in a hernia truss having a pad for closing the hernia opening, means for maintaining the pad in closing position with respect to the hernia opening regardless of normal body movements tending to cause the pad to slip.

These and other objects are effected by the invention as will be apparent from the following description and claim, taken in accordance with the accompanying drawings forming a part of this application, in which:

Fig. 1 is a perspective view of a hernia truss constructed in accordance with the present invention;

Fig. 2 is an enlarged, fragmentary, elevational view of a hernia truss pad, taken along the line II—II of Fig. 1, looking in the direction indicated by the arrows;

Fig. 3 is an end elevational view of the pad shown in Fig. 2, viewed from the left of the latter figure;

Figure 4 is a sectional view, taken along the line IV—IV of Fig. 3, looking in the direction indicated by the arrows;

Fig. 5 is a sectional view, taken along the line V—V of Fig. 3, looking in the direction indicated by the arrows;

Fig. 6 is a view similar to Fig. 3 of an end of a pad, but with the latter tilted relative to its support; and, Fig. 7 is a view similar to Fig. 6, but showing the pad tilted in the opposite direction relative to its support.

In the use of devices of the type illustrated in the drawings, successful support may depend upon proper application of pressure by the truss, and particularly upon application of pressure in the right direction or at the right angle to prevent outward movement of the hernia into the hernia opening or cavity.

Where the truss employs a bow or U-shaped member adapted to fit on the hip of the wearer and having a pad at one or both ends, as herein illustrated, it has been found desirable to provide a connection between the pad and the U-shaped member which is swiveled, or at least partially self-adjusting, to permit the pad to tilt and remain parallel to the surface of the wearer's body at the hernia region as the plane of the latter shifts relative to the U-shaped member.

However, such shifting of the plane of the surface of the wearer's body usually does not involve any change in the position of the hernia, and consequently the direction in which the hernia-supporting force or pressure of the truss is applied should not be varied. Nevertheless, such variations in the direction of application of pressure do occur when swiveling or tilting pads are utilized, particularly if the pad has a slightly domed surface.

Applicant's invention eliminates this disadvantage while retaining the previously-obtained advantages thereof as well as producing additional advantages as will hereinafter appear.

Referring now to the drawings in greater detail, the reference character 10 indicates, in its entirety, a truss for supporting and retaining hernias and the like, which truss comprises a U-shaped pad-supporting member 11, preferably of spring steel, adapted to fit on or about the hip of the wearer, and a pair of pads 12 removably carried at the free ends of the U-shaped member 11. Each free end of the legs of the U-shaped pad support 11 terminates in an eye or loop providing an enlargement or head 13 on which to mount the pad 12. Preferably, these heads 13 lie in planes substantially perpendicular to the plane containing the remainder of the pad support, so that when the latter embraces the wearer's body the heads will lie flat with respect to the surface of the wearer's body at the region of contact therewith.

The pad 12 is of soft deformable material, for example, sponge rubber, altho this particular material is mentioned by way of illustration only, as it will be apparent that other materials, including other types of rubber, will function satisfactorily.

Inasmuch as both pads are of identical construction, only one will be described in detail, in the interest of brevity. The pad is formed with a central hollow or pocket 14 of a size to receive the head 13, and having an entrance 15 for reception of the adjacent portion of the pad support 11. Inasmuch as the pad material is deformable, the entrance 15 may be stretched sufficiently to pass the head 13, particularly if the latter is slightly lubricated, as with soap.

The deformability of the pad also permits the latter to be rotated on the head with the support 11 constituting the axis of rotation, rotation through 180 degrees resulting in reversal of the faces of the pad, which faces differ in the manner now to be described.

As clearly illustrated in Figs. 3 and 5, the pad has a dome-shaped side 16 and an opposite side which comprises a flat central portion 17 and a convex annular portion 18, the latter joining the central portion 17 with an annular edge 19 which is common to both faces of the pad. A variety of pad face shapes may be found desirable, the particular face to be placed against the wearer's body depending on the fleshiness of the wearer, the size of the hernia opening, etc.

An important advantage resulting from the deformability of the pad in combination with the flat head 13 on which the pad is mounted, is illustrated in Figs. 6 and 7, Fig. 6 showing the pad tilted with respect to the head 13, the inclination being outward and downward relative to the wearer's body, against which face 17 of the pad engages.

Such tilting of the pad might result, for example, when the wearer crosses one knee over the other while seated. It will be apparent from consideration of Fig. 6 that while the pad tilts so that it continues to lie flat against the surface of the wearer's body, the lower edge of the head 13 deforms the pad towards the wearer's body, as at 20, to provide a projection serving to maintain the hernia opening closed and prevent slippage of the pad with respect to the hernia opening.

The same action occurs when the pad is tilted in the opposite direction, i. e. outwardly and upwardly as shown in Fig. 7, it being assumed that face 17 is against the wearer's body. In this situation the head 13 causes a protuberance at 21, serving to maintain the hernia opening closed and preventing slippage of the pad.

What is claimed is:

A hernia truss pad having a pair of opposite sides meeting in a common edge, one of said sides being dome-shaped throughout and the opposite side having a flat central portion and a convex annular portion joining said central portion with said common edge, said pad having a circular hollow center whose diameter is greater than its height, said diameter lying in the plane containing the pad common edge, and said pad having a restricted opening to said hollow center through said edge, the material of said pad being elastic, whereby the opening may be temporarily expanded to permit entry to the hollow center of an enlarged head of a truss support.

EDGAR A. CREIGHTON.

REFERENCES CITED

The following references are of record in the file of this patent:

UNITED STATES PATENTS

| Number | Name | Date |
| --- | --- | --- |
| 1,293,878 | Nelson | Feb. 11, 1919 |
| 1,478,388 | Gray | Dec. 25, 1923 |
| 1,740,953 | Norwood | Dec. 24, 1929 |
| 2,142,073 | Dobbs (1) | Dec. 27, 1938 |
| 2,142,074 | Dobbs (2) | Dec. 27, 1938 |
| 2,270,291 | Grey | Jan. 20, 1942 |
| 2,318,613 | Lane | May 11, 1943 |
| 2,323,826 | Mason | July 6, 1943 |